United States Patent
He et al.

(10) Patent No.: US 8,753,241 B2
(45) Date of Patent: Jun. 17, 2014

(54) HYBRID PROPULSION SYSTEM

(75) Inventors: Qiang He, Beijing (CN); Feng Li, Beijing (CN); Bao Li, Beijing (CN); Yun Zhao, Beijing (CN); Yang Li, Beijing (CN); Zengguang Sun, Beijing (CN); Yu Li, Beijing (CN)

(73) Assignees: Beiqi Foton Motor Co., Ltd., Beijing (CN); Beijing Zhi Ke Investment and Management Co., Ltd., Beijing (CN)

( * ) Notice: Subject to any disclaimer, the term of this patent is extended or adjusted under 35 U.S.C. 154(b) by 0 days.

(21) Appl. No.: 13/807,656

(22) PCT Filed: Mar. 11, 2011

(86) PCT No.: PCT/CN2011/071715
§ 371 (c)(1),
(2), (4) Date: Dec. 28, 2012

(87) PCT Pub. No.: WO2012/000325
PCT Pub. Date: Jan. 5, 2012

(65) Prior Publication Data
US 2013/0102430 A1    Apr. 25, 2013

(30) Foreign Application Priority Data
Jun. 29, 2010  (CN) .......................... 2010 1 0221116

(51) Int. Cl.
*B60K 6/365* (2007.10)
(52) U.S. Cl.
USPC ............................................................ 475/5

(58) Field of Classification Search
None
See application file for complete search history.

(56) References Cited

U.S. PATENT DOCUMENTS

| | | | |
|---|---|---|---|
| 7,057,304 B2 | 6/2006 | Ueda | |
| 7,465,251 B2 | 12/2008 | Zhang | |
| 7,479,081 B2 * | 1/2009 | Holmes | 475/5 |
| 8,337,352 B2 * | 12/2012 | Morrow et al. | 475/5 |
| 2010/0261565 A1 * | 10/2010 | Ai et al. | 475/5 |

FOREIGN PATENT DOCUMENTS

| | | |
|---|---|---|
| CN | 1660622 A | 8/2005 |
| CN | 101318462 A | 12/2008 |
| CN | 201325317 Y | 10/2009 |
| CN | 201437326 U | 4/2010 |
| EP | 1097830 A1 | 5/2001 |
| EP | 2085647 A1 | 8/2009 |

* cited by examiner

*Primary Examiner* — Dirk Wright
(74) *Attorney, Agent, or Firm* — Volpe and Koenig, P.C.

(57) ABSTRACT

Disclosed is a hybrid propulsion system, comprising an engine, a first motor, a second motor, a power coupling device and a drive shaft. The power coupling device includes a first propeller shaft connected with said engine via a first clutch, a second propeller shaft connected with the rotor of said first motor, and a third propeller shaft connected with the rotor of said second motor. By a planetary gear mechanism with an inner ring gear, said first propeller shaft, said second propeller shaft and said third propeller shaft come into driving engagement with one another. Said inner ring gear and said third propeller shaft are individually selectively in driving engagement with said drive shaft.

17 Claims, 1 Drawing Sheet

HYBRID PROPULSION SYSTEM

This application is a 35 USC §371 national stage application of PCT/CN2011/071715, which was filed Mar. 11, 2011 and is incorporated herein by reference as if fully set forth.

FIELD OF THE INVENTION

The present invention relates to a hybrid vehicle (HV), particularly to a hybrid propulsion system for HV.

BACKGROUND OF THE INVENTION

HV has two power sources: engine and motor. According to the connecting method, HV propulsion systems may be classified into three forms: series, parallel and series-parallel.

A series propulsion system refers to that the engine directly drives the dynamo to supply electricity to the energy storing device and motors and the motors drive the vehicle to run. A parallel propulsion system refers to that the engine and the motors may drive the vehicle separately and jointly.

The driving modes of series propulsion systems and parallel propulsion systems are relatively singular and do not have the advantages of a hybrid propulsion system, so series-parallel propulsion systems are used normally at present. A series-parallel propulsion system refers to that the engine and the motors are coupled together via a speed-change mechanism, thereby the relations between the rotate speed of the engine and the motors can be regulated according to the running condition. Compared with a series propulsion system and a parallel propulsion system, a series-parallel propulsion system may more flexibly regulate the power output of the engine and the operation of the motors according to the operating condition.

In a conventional series-parallel propulsion system, the power coupling between the engine and motors is generally realized via a speed-change mechanism. However, the speed-change mechanism typically adopted by a conventional series-parallel propulsion system has a large volume and is not convenient for the arrangement of the components of HV. Further, a conventional series-parallel propulsion system does not give full consideration to the power distribution among the engine and the motors and is unable to ensure the engine and motors are in a desirable state in different operating conditions to obtain higher output power.

Therefore, a pressing technical problem in the art is how to realize a compact structure and desirable power distribution among the engine and the motors for a conventional HV.

SUMMARY OF THE INVENTION

The object of the present invention is to provide a hybrid propulsion system which has a compact structure and ensures desirable power distribution among the engine and the motors.

According to one aspect of the present invention, a hybrid propulsion system is provided, which comprises an engine, a first motor, a second motor, a power coupling device and a drive shaft, wherein the power coupling device includes:

a first propeller shaft, connected with the engine via a first clutch;
a second propeller shaft, connected with the rotor of the first motor;
a third propeller shaft, connected with the rotor of the second motor;
the first propeller shaft, the second propeller shaft and the third propeller shaft come into driving engagement with one another by a planetary gear mechanism having an inner ring gear;
the inner ring gear and the third propeller shaft are individually selectively in driving engagement with the drive shaft.

Preferably, the planetary gear mechanism also comprises: a small sun gear, a large sun gear, and a short planetary gear and a long planetary gear, which are supported by the same planetary carrier in a rotatable manner and are engaged with each other, the small sun gear is engaged with the short planetary gear, and the long planetary gear is engaged with the large sun gear and the inner ring gear;

the first propeller shaft, the second propeller shaft and the third propeller shaft are coaxial, the first propeller shaft is connected with one of the planetary carrier and the small sun gear, the second propeller shaft is connected with another of the planetary carrier and the small sun gear, and the third propeller shaft is connected with the large sun gear.

Preferably, the first propeller shaft runs through the second propeller shaft and is connected with the planetary carrier.

Preferably, the power coupling device also comprises a first driving wheel and a second driving wheel, which are coaxial with the drive shaft. The first driving wheel is in driving engagement with the inner ring gear and connected with the drive shaft via a second clutch, and the second driving wheel is in driving engagement with the third propeller shaft and connected with the drive shaft via a third clutch.

Preferably, the first driving wheel is a gear, and a first outer gear engaged with the first driving wheel is disposed on the outer peripheral surface of the inner ring gear.

Preferably, the first driving wheel is a gear, the inner ring gear is connected with a second outer gear engaged with the first driving wheel, and the base radius of the second outer gear is smaller than that of the inner ring gear.

Preferably, the second driving wheel is a gear, a third outer gear engaged with the second driving wheel is disposed on the third propeller shaft; or, the second driving wheel is a chain wheel, another chain wheel is disposed on the third propeller shaft, and a drive chain is connected between the two chain wheels.

Preferably, the hybrid propulsion system comprises an energy storing device, a brake and a controller, the energy storing device is electrically connected with the first motor and the second motor, the brake control the rotation of at least one of the small sun gear, the large sun gear, the planetary carrier and the inner ring gear, and the controller is used to control the operation of the first motor, the second motor, the first clutch, the second clutch, the third clutch and the brake.

Preferably, the hybrid propulsion system has at least one of the following operating modes:

EV mode, in which the engine stops operation, at least one of the first motor and the second motor runs, the first clutch is disengaged, and at least one of the second clutch and third clutch is engaged.

Engine mode, in which the engine runs, the first clutch is engaged, both of the first motor and the second motor stop running, and the second clutch and/or the third clutch are engaged.

Hybrid drive mode, in which the engine runs, the first clutch, the second clutch and the third clutch are all engaged and at least one of the first motor and the second motor converts electrical energy into mechanical energy.

Power generation mode, in which the engine runs, the first clutch is engaged and at least one of the first motor and the second motor converts mechanical energy into electrical energy.

Energy recovery mode, in which the first clutch is disengaged, at least one of the second clutch and the third clutch is engaged, and the drive shaft drives the first propeller shaft and/or the second propeller shaft to rotate, thereby enabling the first motor and/or the second motor to convert mechanical energy into electrical energy.

According to the technical solution of the present invention, the power from the engine, the first motor and the second motor is coupled together via the power coupling device having three propeller shafts, and the power from the three propeller shafts is engaged by the planetary gear mechanism. Further, the inner ring gear and the third propeller shaft connected by the second motor may be individually used as power output components according to different operating conditions. Therefore, the hybrid propulsion system has a more compact structure and enables desirable power distribution among the engine and the motors, thereby ensuring desirable working states of the engine and/or the motors in different operating conditions.

| Reference Signs of Main Components | |
|---|---|
| First clutch | 11 |
| Second clutch | 12 |
| Third clutch | 13 |
| Engine | 100 |
| First motor | 101 |
| Second motor | 102 |
| First driving wheel | 105 |
| Second driving wheel | 106 |
| Power coupling device | 200 |
| First propeller shaft | 201 |
| Second propeller shaft | 202 |
| Third propeller shaft | 203 |
| Inner ring gear | 204 |
| First outer gear | 205 |
| Second outer gear | 206 |
| Third outer gear | 207 |
| Drive shaft | 300 |
| Small sun gear | 401 |
| Large sun gear | 402 |
| Planetary carrier | 403 |
| Short planetary gear | 404 |
| Long planetary gear | 405 |

DETAILED DESCRIPTION OF THE EMBODIMENTS

The specific embodiments of the present invention will now be described by referring to the accompanying drawings.

Figure 1:
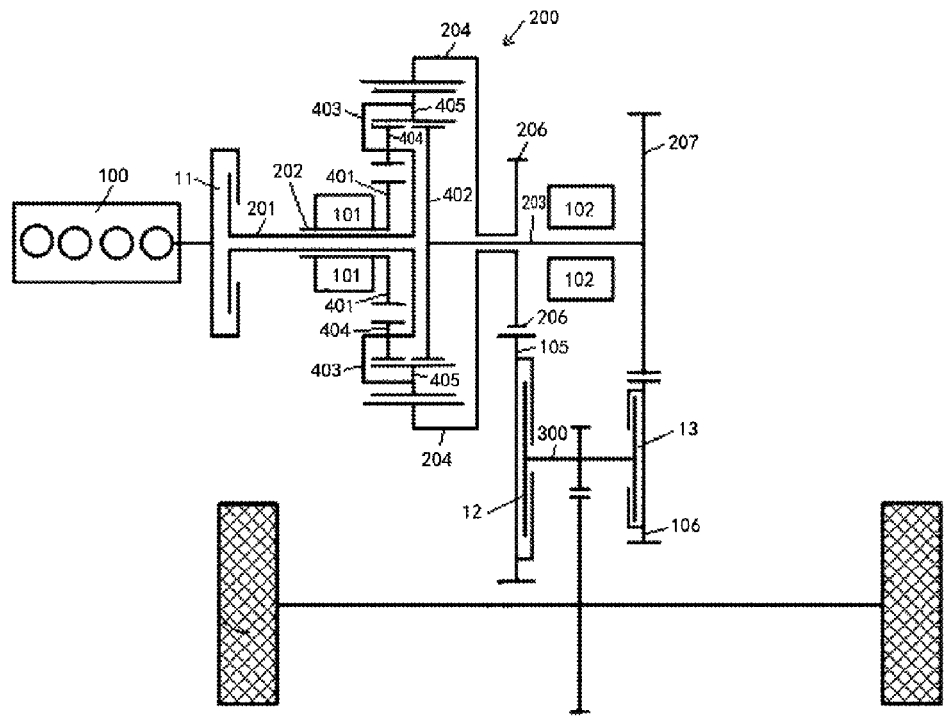
FIG. 1 is a schematic view of a hybrid propulsion system according to a preferred embodiment of the present invention.
Figure 2:
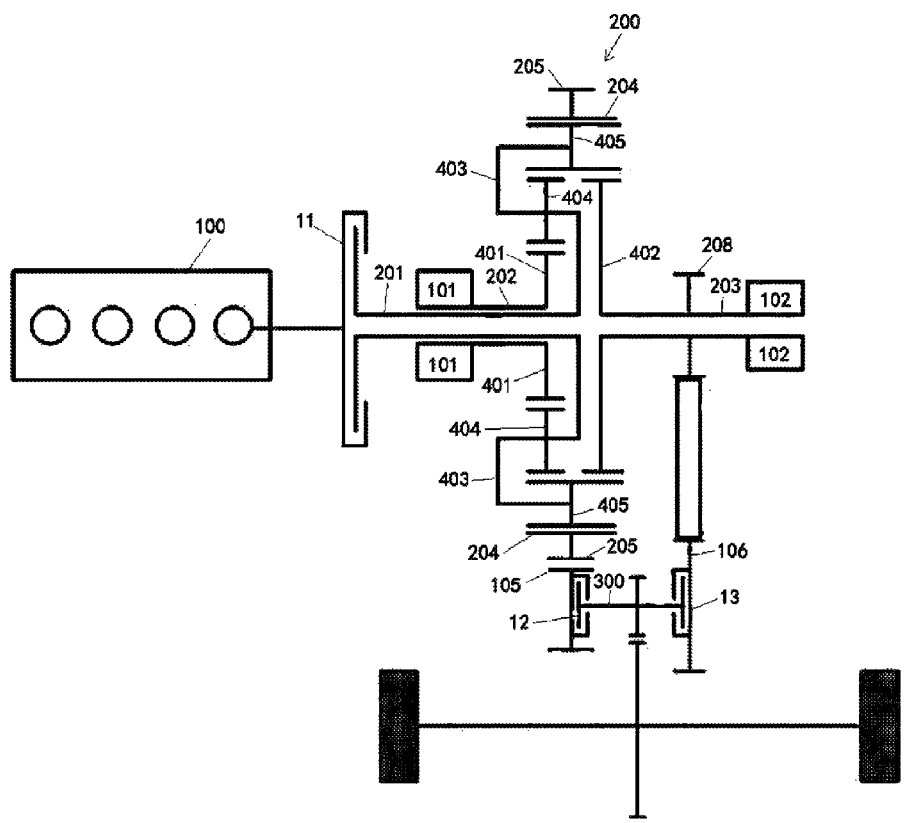
FIG. 2 is a schematic view of a hybrid propulsion system according to another preferred embodiment of the present invention.

As shown in FIG. 1 and FIG. 2, the hybrid propulsion system provided by the present invention comprises an engine 100, a first motor 101, a second motor 102, a power coupling device 200 and a drive shaft 300. The power coupling device 200 includes:

a first propeller shaft 201, connected with the engine 100 via a first clutch 11;
a second propeller shaft 202, connected with the rotor of the first motor 101;
a third propeller shaft 203, connected with the rotor of the second motor 102;
the first propeller shaft 201, the second propeller shaft 202 and the third propeller shaft 203 come into driving engagement with one another by a planetary gear mechanism having an inner ring gear 204;
the inner ring gear 204 and the third propeller shaft 203 are individually selectively in driving engagement with the drive shaft 300.

The engine 100 may be a conventional engine for motor vehicle. The first motor 101 and the second motor 102 are coupled with the engine 100 via the power coupling device 200, and the first motor 101 and/or the second motor 102 may be individually used either as motors converting electrical energy into mechanical energy, or dynamos converting mechanical energy into electrical energy, or starting motors of the engine 100. The working states of the first motor 101 and/or the second motor 102 may be selected according to the actual operating conditions. This will be described in detail below.

In order to couple the power transmitted by the engine 100, the first motor 101 and the second motor 102, the power coupling device 200 has three propeller shafts, wherein, the first propeller shaft 201 is connected with the engine 100 via the first clutch 11, and the engagement and disengagement of the first clutch 11 may control the power transmission between the first propeller shaft 201 and the engine 100. The second propeller shaft 202 is connected with the rotor of the first motor 101. The third propeller shaft 203 is connected with the rotor of the second motor 102. Therefore, in the hybrid propulsion system provided by the present invention, the engine 100, the first motor 101 and the second motor 102 are respectively connected with different propeller shafts, thereby ensuring desirable working states of the engine 100, the first motor 101 and the second motor 102 in different operating conditions.

In particular, the first propeller shaft 201, the second propeller shaft 202 and the third propeller shaft 203 come into driving engagement with one another by the planetary gear mechanism having the inner ring gear 204, thereby realizing power coupling of the engine 100, the first motor 101 and the second motor 102. The planetary gear mechanism can realize a compact structure, thereby facilitating for the layout of the components in HV. The planetary gear mechanism will be described in detail below.

Further, the drive shaft 300 is a component driving the drive wheels of HV. The drive shaft 300 may be a component directly or indirectly driving the drive wheels. The drive shaft 300 receives the power from the engine 100, the first motor 101 and/or the second motor 102 and transmits it to the driving wheel of the vehicle, thereby driving the vehicle to run. In particular, as shown in FIG. 1 and FIG. 2, the inner ring gear 204 and the third propeller shaft 203 are individually selectively in driving engagement with the drive shaft 300. Therefore, the inner ring gear 204 of the planetary gear mechanism and the third propeller shaft 203 (the large sun gear 402 connected with the third propeller shaft 203) may serve as power output components of the planetary gear mechanism.

Further, the power transmission between the inner ring gear 204 and the drive shaft 300 and the power transmission between the third propeller shaft 203 (as well as the large sun gear 402) and the drive shaft 300 may be controlled by clutches. For example, as shown in FIG. 1 and FIG. 2, the second clutch 12 and the third clutch 13 may be used. The foregoing first clutch 11, second clutch 12 and third clutch 13 may all be conventional clutches, such as applicable dry clutches or wet clutches.

By this structure, the second clutch 12 may be selectively engaged to use the inner ring gear 204 as a power output component; or the third clutch 13 is engaged to use the third propeller shaft 203 as a power output component; or the second clutch 12 and the third clutch 13 are engaged in the same time to transmit the power of the inner ring gear 204 and the second propeller shaft 203 to the drive shaft 300 in the same time.

As the hybrid propulsion system provided by the present invention can realize various options of power output, it facilitates the selection of different working modes in different operating condition, thereby ensuring desirable working states of the engine 100, the first motor 101 and the second motor 102.

As described above, the first propeller shaft 201, the second propeller shaft 202 and the third propeller shaft 203 come into driving engagement with one another by the planetary gear mechanism having the inner ring gear 204. Under a preferred condition, as shown in FIG. 1 and FIG. 2, in addition to the inner ring gear 204, the planetary gear mechanism may also comprise: a small sun gear 401, a large sun gear 402, and mutually engaged short planetary gear 404 and long planetary gear 405, which are supported by the same planetary carrier 403 in a rotatable manner, the small sun gear 401 is engaged with the short planetary gear 404, and the long planetary gear 405 is also engaged with the large sun gear 402 and the inner ring gear 204.

The first propeller shaft 201 is connected with one of the planetary carrier 403 and the small sun gear 401, the second propeller shaft 202 and the third propeller shaft 203 are coaxial, the second propeller shaft 202 is connected with another of the planetary carrier 403 and the small sun gear 401, and the third propeller shaft 203 is connected with the large sun gear 402.

To be specific, the planetary gear mechanism may be a Ravigneaux planetary gear mechanism, or a planetary gear mechanism slightly modified on the basis of a Ravigneaux planetary gear mechanism.

A Ravigneaux planetary gear mechanism is adopted because on the one hand, the structure of this planetary gear mechanism is compact, such that occupies a smaller space and facilitates the spatial layout of the vehicle; on the other hand it can couple the power from the engine 100, the first motor 101 and the second motor 102 together and allow individual connection of the engine 100, the first motor 101 and the second motor 102 with different propeller shafts, thereby ensuring desirable working states of the engine 100, the first motor 101 and the second motor 102 in different operating conditions.

When a Ravigneaux planetary gear mechanism is adopted, the engine 100, the first motor 101 and the second motor 102 may be individually selectively connected with three different rotating elements of the Ravigneaux planetary gear mechanism. In other words, the engine 100, the first motor 101 and the second motor 102 can be individually selectively connected with any three of the small sun gear 401, the large sun gear 402, the inner ring gear 204 and the planetary carrier 403 of the Ravigneaux planetary gear mechanism, thereby obtaining different power coupling relations.

For example, the first propeller shaft 201 connected with the engine 100 may be connected with the small sun gear 401, the second propeller shaft 202 connected with the first motor 101 may be connected with the planetary carrier 403, and the third propeller shaft 203 connected with the second motor 102 may be connected with the large sun gear 402; or, the first propeller shaft 201 connected with the engine 100 may be connected with the planetary carrier 403, the second propeller shaft 202 connected with the first motor 101 may be connected with the planetary carrier 403, and the third propeller shaft 203 connected with the second motor 102 may be connected with the large sun gear 403. There are also other forms. They are not enumerated here.

However, preferably, considering the convenience of the layout of each component, as shown in FIG. 1 and FIG. 2, the first propeller shaft 201 connected with the engine 100 is connected with the planetary carrier 403, the second propeller shaft 202 connected with the first motor 101 is connected with the small sun gear, and the third propeller shaft 203 connected with the second motor 102 is connected with the large sun gear 402, thereby realizing power coupling of the engine 100, the first motor 101 and the second motor 102.

According to this layout, the first motor 101 is connected with the small sun gear 401 and the second motor 102 is connected with the large sun gear 402. Thereby the first motor 101 and the second motor 102 do not need a large radial dimension and a compact structure in the radial direction can be obtained, particularly to the first motor 101 and the second motor 102.

In respect to the planetary carrier 403, it may have different setting forms. In a conventional Ravigneaux planetary gear mechanism, the planetary carrier 403 typically supports the short planetary gear 404 and the long planetary gear 405 outside the small sun gear 401 in a rotatable manner (under this circumstance, in order to connect the planetary carrier 403, the first propeller shaft 201 may be hollow). The technical solution of this application may also adopt this form.

Under a preferred condition, as shown in FIG. 1 and FIG. 2, the first propeller shaft 201 runs through the second propeller shaft 202 and is connected with the planetary carrier 403. In other words, the second propeller shaft 202 is hollow and the first propeller shaft 201 runs through the inner space of the second propeller shaft 202 and then is connected with the planetary carrier 403, such that a part of the planetary carrier 403 lie between the small sun gear 401 and the large sun gear 402 to obtain a more compact structure. This characteristic is a modification to a conventional Ravigneaux planetary gear mechanism.

Further, the foregoing planetary gear mechanism is not limited to a Ravigneaux planetary gear mechanism. Instead, other types of planetary gear mechanisms may be adopted, too, provided that it allows individual connection of the engine 100, the first motor 101 and the second motor 102 with different propeller shaft. For example, it may adopt a compound gear train including an ordinary gear train and an epicyclic gear train, which may refer to Chapter 9 of "Principle of Mechanics" written by the Teaching and Research Office for Principle of Mechanics and Mechanical Parts, Northwestern Polytechnical University (Chief Editors Sun Heng and Chen Zuomo, May 5, 1996, printed on the third time in December 1997) in detail.

The planetary gear mechanism adopted by a power coupling device 200 is described in details above. As shown above, the engine 100, the first motor 101 and the second motor 102 all may be individually used as power sources, while the inner ring gear 204 and the third propeller shaft 203 connected with the large sun gear 402 may individually serve as power output components. The connection between the power coupling device 200 and the drive shaft 300 will be described in detail below.

In order to allow the power from the inner ring gear 204 and that from the third propeller shaft 203 to be transmitted to the drive shaft 300 selectively individually or jointly, various forms may be adopted.

For example, the inner ring gear 204 may transmit power to the drive shaft 300 via a gear mechanism, which may be controlled by a clutch, synchronizer or other power transmission control components to realize the connection or disconnection of power transmission.

Preferably, as shown in FIG. 1 and FIG. 2, the power coupling device 200 also comprises a first driving wheel 105 and a second driving wheel 106, which are coaxial with the drive shaft 300. The first driving wheel 105 is in driving engagement with the inner ring gear 204 and is connected with the drive shaft 300 via the second clutch 12. The second driving wheel 106 is in driving engagement with the third propeller shaft 203 and is connected with the drive shaft 300 via the third clutch 13. By using the second clutch 12 and the third clutch 13, the power engagement of the inner ring gear 204 and the second propeller shaft 203 with the drive shaft 300 may be controlled.

The first driving wheel 105 is directly or indirectly engaged with the inner ring gear 204 via an appropriate drive mechanism, thereby receiving the power from the inner ring gear 204. Further, since a second clutch 12 is disposed between the inner ring gear 204 and the first driving wheel 105, the power of the inner ring gear 204 may be selectively transmitted to the drive shaft 300 by controlling the engagement or disengagement of the second clutch 12. The second driving wheel 106 may receive the power from the third propeller shaft 203 by a similar method and selectively transmit power to the drive shaft via the third clutch 13. Of course, the power from the inner ring gear 204 and that from the third propeller shaft 203 may be transmitted to the drive shaft 300 in the same time.

The first driving wheel 105 may be disposed in an appropriate way to realize power engagement with the drive shaft 300. As shown in FIG. 1 and FIG. 2, the first driving wheel 105 and the drive shaft 300 are coaxially disposed on one end of the drive shaft 300. Anyhow, the present invention is not limited to this. For example, the first driving wheel 105 may be disposed on the drive shaft 300 in a rotatable manner, and is controlled through operation of a synchronizer to freely rotate on the drive shaft 300, or rotate along with the drive shaft 300. In respect to the second driving wheel 106, it may adopt a setting similar or different from that of the first driving wheel 105, as long as it may realize selective transmission of the power of the third propeller shaft 203 to the drive shaft 300.

The power transmission between the inner ring gear 204 and the first driving wheel 105 and the power transmission between the third propeller shaft 203 and the second driving wheel 106 will be described in details below.

In respect to the inner ring gear 204 and the first driving wheel 105, power transmission may be realized by various manners.

For example, the first driving wheel 105 may adopt friction wheel transmission, chain wheel transmission and etc, but under a preferred condition, as shown in FIG. 1, the first driving wheel 105 is a gear, and a first outer gear 205 (directly or indirectly) engaged with the first driving wheel 105 is disposed on the peripheral surface of the inner ring gear 204. Preferably, the first outer gear 205 disposed on the peripheral surface of the inner ring gear 204 is directly engaged with the first driving wheel 105, thereby avoiding power loss.

For another example, as shown in FIG. 2, the first driving wheel 105 is a gear, the inner ring gear 204 is connected with a second outer gear 206 which is engaged with the first driving wheel 105, and the base radius of the second outer gear 206 is smaller than the base radium of the inner ring gear 204.

When the inner ring gear 204 rotates, the second outer gear 206 rotates together with the inner ring gear 204. Meanwhile, as the base radius of the second outer gear 206 is smaller than the base radius of the inner ring gear 204, typically, the second outer gear 206 is at one side of the inner ring gear 204. Thereby, comparing with the circumstance of disposing the first outer gear 205 on the peripheral surface of the inner ring gear 204, it can reduce the occupation of the space in the radial direction, so that obtaining a more compact layout in the radial direction. Of course, in respect to the circumstance of disposing the first outer gear 205 on the peripheral surface of the inner ring gear 204, the space occupied in the axial direction is small, so it is applicable to the work condition requiring a compact space in the axial direction.

Therefore, in different work condition, different manners may be adopted to realize power transmission between the third propeller shaft 203 and the second driving wheel 106.

In respect to the third propeller shaft 203 and the second driving wheel 106, the third propeller shaft 203 may be in driving engagement with the second driving wheel 106 by various manners.

For example, as shown in FIG. 1, the second driving wheel 106 may be a gear, and a third outer gear 207 (directly or indirectly) engaged with the second driving wheel 106 is disposed on the third propeller shaft 203. In other words, the power transmission between the third propeller shaft 203 and the second driving wheel 106 is realized by gear transmission. This connecting form is particularly applicable to the application situation where the space between the third propeller shaft 203 and the second driving wheel 106 is small.

Alternatively, as shown in FIG. 2, the second driving wheel 106 is a chain wheel, another chain wheel 208 is disposed on the third propeller shaft 203, and a drive chain is connected between these two chain wheels. In other words, the power transmission between the third propeller shaft 203 and the second driving wheel 106 is realized by chain drive. This connecting form is particularly applicable to the application situation where the space between the third propeller shaft 203 and the second driving wheel 106 is large.

Of course, as described above, in the present invention, the power transmission between the third propeller shaft 203 and the second driving wheel 106 is not limited to the above embodiment. For example, belt drive and friction wheel drive and other driving forms may be adopted. This is also applicable to the power transmission between the inner ring gear 204 and the first driving wheel 105.

The main components of the hybrid propulsion system provided by the present invention as well as their connecting relations are described in details above. In addition to the above main components, preferably, the hybrid propulsion system comprises an energy storing device, a brake and a controller. The energy storing device is electrically connected with the first motor 101 and the second motor 102, the brake can control the rotation of at least one of the small sun gear 401, the large sun gear 402, the planetary carrier 403 and the inner ring gear 204, and the controller is used to control the operation of the first motor 101, the second motor 102, the first clutch 11, the second clutch 12, the third clutch 13 and the brake.

In other words, during work, the energy storing device can provide electrical energy for the first motor 101 and the second motor 102 to allow the first motor 101 and the second motor 102 to convert electrical energy into mechanical energy. Further, the energy storing device can also store the electrical energy converted from mechanical energy by the first motor 101 and the second motor 102.

The energy storing device may be conventional rechargeable batteries, Ni-MH batteries and lithium ion batteries for example.

Further, a brake is provided, which can control the motion state of each component of the planetary gear mechanism to make each component rotate or braked, thereby providing the planetary gear mechanism with different drive characteristics (such as: drive route and speed ratio) and meeting the requirements of the vehicle in different operating conditions.

For example, as shown in FIG. 1 and FIG. 2, the brake may control the rotation of at least one of the small sun gear 401, the large sun gear 402, the planetary carrier 403 and the inner ring gear 204. Typically, the brake may be disposed in the radial direction of a rotating component and can prevent rotation of the rotating component when the brake is engaged with the rotating component and allow rotation of the rotating component when the brake is disengaged with the rotating component.

The controller (such as: ECU) may selectively control the operating modes of the hybrid propulsion system of a vehicle according to the operating conditions of the vehicle. In other words, by controlling every motor, clutch and brake, the hybrid propulsion system is in the predetermined operating mode to adapt to different operating condition. The controller mentioned here may be a single control device, or the collection of a plurality of control devices.

The operating modes of the hybrid propulsion system will be described below. To be specific, the hybrid propulsion system may possess at least one of the following operating modes to adapt to different operating conditions.

A) EV mode: The engine 100 does not need to work (i.e.: the engine 100 stops operation), and the power of the drive shaft 300 is provided by the first motor 101 and/or the second motor 102.

To be specific, at least one of the first motor 101 and the second motor 102 runs. The first clutch 11 is disengaged, thereby cutting off the power transmission between the engine 100 and the planetary gear mechanism and raising the transmission efficiency in EV mode.

Further, in order to transmit the power from at least one of the first motor 101 and the second motor 102 to the drive shaft, at least one of the second clutch 12 and the third clutch 13 is engaged. As described above, each of the inner ring gear 204 and the third propeller shaft 203 may serve as power output components. Thus, engagement with different clutches may be selected based on different power output components. For example, when only the inner ring gear 204 outputs power, the second clutch 12 may be engaged, while the third clutch 13 is disengaged.

Under normal condition, when the electric quantity of the energy storing device is sufficient, EV mode may be adopted. In this case, the power of the vehicle is provided only by the first motor 101 and/or the second motor 102. In this mode, the vehicle may be directly started. Further, by controlling the rotation direction of the running motor, the backward movement of the vehicle can be easily realized.

B) Engine mode: The engine 100 runs, the first clutch 11 is engaged, both the first motor 101 and the second motor 102 stop running, and the second clutch 12 and/or the third clutch 13 are engaged.

Under the engine mode, only the engine 100 provides power for the drive shaft 300, while the first motor 101 and the second motor 102 both stop running. The small sun gear 401 may be in a state of braking or free rotation, while the large sun gear 402 may also be in a state of braking or free rotation, thereby enabling the planetary gear mechanism to have different drive characteristics. Alternatively, different power output components may be selected to adapt to different operating conditions. For example, the small sun gear 401 and the large sun gear 402 may be both in a state of braking, the power of the engine 100 is transmitted to the first propeller shaft 201 via the first clutch 11, and transmitted to the drive shaft 300 via the second clutch 12 after coupling with the power coupling device 200. As the third propeller shaft 203 and the large sun gear 402 are braked, the third clutch 13 may be either engaged or disengaged, but disengagement is preferred.

The engine mode is applicable to the situation where the electric quantity of the energy storing device is insufficient or the device breaks down. Further, by controlling the planetary drive mechanism, different transmission ratio can be realized, thereby realizing the function of a speed changer.

C) Hybrid drive mode: The engine 100 runs, the first clutch 11, the second clutch 12 and the third clutch 13 are all engaged, and at least one of the first motor 101 and second motor 102 converts electrical energy into mechanical energy.

Under a preferred condition, both the first motor 101 and the second motor 102 run to provide maximum power to the drive shaft 300.

The hybrid mode is applicable to quick acceleration, climbing or high-speed overtaking. As the engine 100 and motors all join the operation, it makes for a desirable working state of the engine 100 and the motors.

D) Power generation mode: The engine 100 runs, the first clutch 11 is engaged and at least one of the first motor 101 and the second motor 102 converts mechanical energy into electrical energy. This mode is available both when the vehicle is running and when the vehicle is a state of stop. In other words, whether the vehicle is running or stopped, the first motor 101 and/or the second motor 102 can convert partial energy of the engine 100 into electrical energy, and stores it in the energy storing device, thereby realizing the effect of power generation. Therefore, the electric quantity of the energy storing device can always be maintained at an appropriate level.

The power generation mode is applicable to the situation where the electric quantity of the energy storing device is low and should be raised. Further, when the vehicle is in a state of stop, the energy storing device may be recharged by an external power source.

E) Energy recovery mode: The first clutch 11 is disengaged, at least one of the second clutch 12 and the third clutch 13 is engaged, and the drive shaft 300 drives the first propeller shaft 201 and/or the third propeller shaft 203 to rotate, thereby enabling the first motor 101 and/or the second motor 102 to convert mechanical energy into electrical energy.

Under this energy recovery mode, the power from the drive shaft 300 is transmitted to the first motor 101 and/or the second motor 102, thereby enabling the first motor 101 and/or the second motor 102 to serve as generators and convert the mechanical energy from the drive shaft 300 into electrical energy, and store it in the energy storing device.

Although the present invention has been disclosed through the foregoing embodiments, the foregoing embodiments are not intended to limit the present invention. Various changes and modifications may be made to the embodiments without departing from the spirit of the invention by those skilled in the art. Therefore, the scope of the invention is to be limited only by the appended claims.

What is claimed is:

1. A hybrid propulsion system, which comprises an engine, a first motor, a second motor, a power coupling device and a drive shaft, wherein the power coupling device includes:

a first propeller shaft connected with the engine via a first clutch;

a second propeller shaft connected with the rotor of the first motor;

a third propeller shaft connected with the rotor of the second motor;

the first propeller shaft, the second propeller shaft and the third propeller shaft come into driving engagement with one another by a planetary gear mechanism having an inner ring gear;

the inner ring gear and the third propeller shaft are individually selectively in driving engagement with the drive shaft.

2. The hybrid propulsion system according to claim 1, wherein the planetary gear mechanism also comprises: a small sun gear, a large sun gear, and mutually engaged short planetary gear and long planetary gear which are supported by the same planetary carrier in a rotatable manner, the small sun gear is engaged with the short planetary gear, and the long planetary gear is also engaged with the large sun gear and the inner ring gear;

the first propeller shaft, the second propeller shaft and the third propeller shaft are coaxial, the first propeller shaft is connected with one of the planetary carrier and the small sun gear, the second propeller shaft is connected with another of the planetary carrier and the small sun gear, and the third propeller shaft is connected with the large sun gear.

3. The hybrid propulsion system according to claim 2, wherein the first propeller shaft runs through the second propeller shaft and is connected with the planetary carrier.

4. The hybrid propulsion system according to claim 1, wherein the power coupling device also comprises a first driving wheel and a second driving wheel, which are coaxial with the drive shaft, the first driving wheel is in driving engagement with the inner ring gear and is connected with the drive shaft via the second clutch, and the second driving wheel is in driving engagement with the second propeller shaft and is connected with the drive shaft via the third clutch.

5. The hybrid propulsion system according to claim 4, wherein the first driving wheel is a gear, and a first outer gear engaged with the first driving wheel is disposed on the outer peripheral surface of the inner ring gear.

6. The hybrid propulsion system according to claim 4, wherein the first driving wheel is a gear, and the inner ring gear is connected with a second outer gear engaged with the first driving wheel, and the base radius of the second outer gear is smaller than that of the inner ring gear.

7. The hybrid propulsion system according to claim 4, wherein the second driving wheel is a gear, a third outer gear engaged with the second driving wheel is disposed on the third propeller shaft; or, the second driving wheel is a chain wheel, another chain wheel is disposed on the third propeller shaft and a drive chain is connected between the two chain wheels.

8. The hybrid propulsion system according to claim 2, wherein the hybrid propulsion system comprises an energy storing device, a brake and a controller, the energy storing device is electrically connected with the first motor and the second motor, the brake can control the rotation of at least one of the small sun gear, the large sun gear, the planetary carrier and the inner ring gear, and the controller is used to control the operation of the first motor, the second motor, the first clutch, the second clutch, the third clutch and the brake.

9. The hybrid propulsion system according to claim 8, wherein the hybrid propulsion system may possess at least one of the following operating modes:

EV mode: the engine stops operation, at least one of the first motor and the second motor runs, the first clutch is disengaged, and at least one of the second clutch and the third clutch is engaged;

Engine mode: The engine runs, the first clutch is engaged, both the first motor and the second motor stop running, and one or more of the second clutch or the third clutch are engaged;

Hybrid drive mode: the engine runs, the first clutch, the second clutch and the third clutch are all engaged, and at least one of the first motor and the second motor converts electric energy into mechanical energy;

Power generation mode: the engine runs, the first clutch is engaged, and at least one of the first motor and the second motor converts mechanical energy into electrical energy; and Energy recovery mode: the first clutch is disengaged, at least one of the second clutch and the third clutch is engaged, and the drive shaft drives one or more of the first propeller shaft or the third propeller shaft to rotate, thereby enabling one or more of the first motor or the second motor to convert mechanical energy into electrical energy.

10. The hybrid propulsion system according to claim 2, wherein the power coupling device also comprises a first driving wheel and a second driving wheel, which are coaxial with the drive shaft, the first driving wheel is in driving engagement with the inner ring gear and is connected with the drive shaft via the second clutch, and the second driving wheel is in driving engagement with the second propeller shaft and is connected with the drive shaft via the third clutch.

11. The hybrid propulsion system according to claim 10, wherein the first driving wheel is a gear, and a first outer gear engaged with the first driving wheel is disposed on the outer peripheral surface of the inner ring gear.

12. The hybrid propulsion system according to claim 10, wherein the first driving wheel is a gear, and the inner ring gear is connected with a second outer gear engaged with the first driving wheel, and the base radius of the second outer gear is smaller than that of the inner ring gear.

13. The hybrid propulsion system according to claim 10, wherein the second driving wheel is a gear, a third outer gear engaged with the second driving wheel is disposed on the third propeller shaft; or, the second driving wheel is a chain wheel, another chain wheel is disposed on the third propeller shaft and a drive chain is connected between the two chain wheels.

14. The hybrid propulsion system according to claim 3, wherein the power coupling device also comprises a first driving wheel and a second driving wheel, which are coaxial with the drive shaft, the first driving wheel is in driving engagement with the inner ring gear and is connected with the drive shaft via the second clutch, and the second driving wheel is in driving engagement with the second propeller shaft and is connected with the drive shaft via the third clutch.

15. The hybrid propulsion system according to claim 14, wherein the first driving wheel is a gear, and a first outer gear engaged with the first driving wheel is disposed on the outer peripheral surface of the inner ring gear.

16. The hybrid propulsion system according to claim 14, wherein the first driving wheel is a gear, and the inner ring gear is connected with a second outer gear engaged with the first driving wheel, and the base radius of the second outer gear is smaller than that of the inner ring gear.

17. The hybrid propulsion system according to claim 14, wherein the second driving wheel is a gear, a third outer gear engaged with the second driving wheel is disposed on the third propeller shaft; or, the second driving wheel is a chain wheel, another chain wheel is disposed on the third propeller shaft and a drive chain is connected between the two chain wheels.

\* \* \* \* \*